April 22, 1969 A. J. LEY 3,440,441

MULTIPLICATIVE MODULATORS

Filed March 1, 1966 Sheet 1 of 2

INVENTOR:
ANTHONY J. LEY

INVENTOR:
ANTHONY J. LEY 3,440,441

MULTIPLICATIVE MODULATORS

Anthony J. Ley, Farnborough, England, assignor to The Solartron Electronic Group Limited, Farnborough, England, a corporation of the United Kingdom Filed Mar. 1, 1966, Ser. No. 530,949
Claims priority, application Great Britain, Mar. 11, 1965, 10,420/65
Int. Cl. G06g 7/16
U.S. Cl. 307—229 9 Claims This invention relates to modulator circuits and particularly to circuits for producing a voltage the arithmetic representation of which is proportional in magnitude to the product of arithmetic representations of two alternating input signal voltages.

An undesirable feature associated with prior art forms of multiplicative modulators is the presence of harmonics of one of the input frequency signals, generally the carrier frequency, in the output signal. Such harmonics are particularly undesirable when high frequency components of the modulating signal are of interest as may be the case when, for example, the modulator is used to produce an output signal to simulate the signal from a tachometer or synchro generator.

An object of the present invention is to provide a modulator circuit which produces an output signal the arithmetic representation of which is proportional to the product of the arithmetic representations of two input signals, this output signal being substantially free of undesirable harmonics.

Another object of the present invention is to provide a modulator circuit which incorporates two pairs of non-linear circuit elements in an arrangement which produces a product signal and which satisfactorily suppresses undesirable harmonics.

Still another object of the present invention is to provide a multiplicative modulator circuit which includes two pairs of emitter coupled transistors, each pair being adapted to receive two input signals, the output of the two pairs being a signal the amplitude of which is proportional to the amplitude of the fundamental of the product of the two input signals.

Briefly described, the present invention includes four transistors connected in two common emitter pair circuits, also known as long-tailed pair circuits, wherein the transistors have substantially identical characteristics. A first signal is applied to the emitter electrodes of one of the transistor pairs, and the same signal is applied to the emitter electrodes of the second pair of transistors but with a reversal of algebraic sign. A second signal is applied to the base electrode of one transistor of each pair and the same second signal is applied to the bases of the other two transistors, but with a reversal sign. An output circuit is coupled to the collectors of two of the transistors, one from each pair, the two selected transistors being those having signals applied to their bases in inverse relationship.

In order that the manner in which the foregoing and other objects are obtained in accordance with the invention can be understood, particularly advantageous embodiments thereof will be described with reference to the accompanying drawings which form a part of this specification and wherein.

Figures 1, 3:
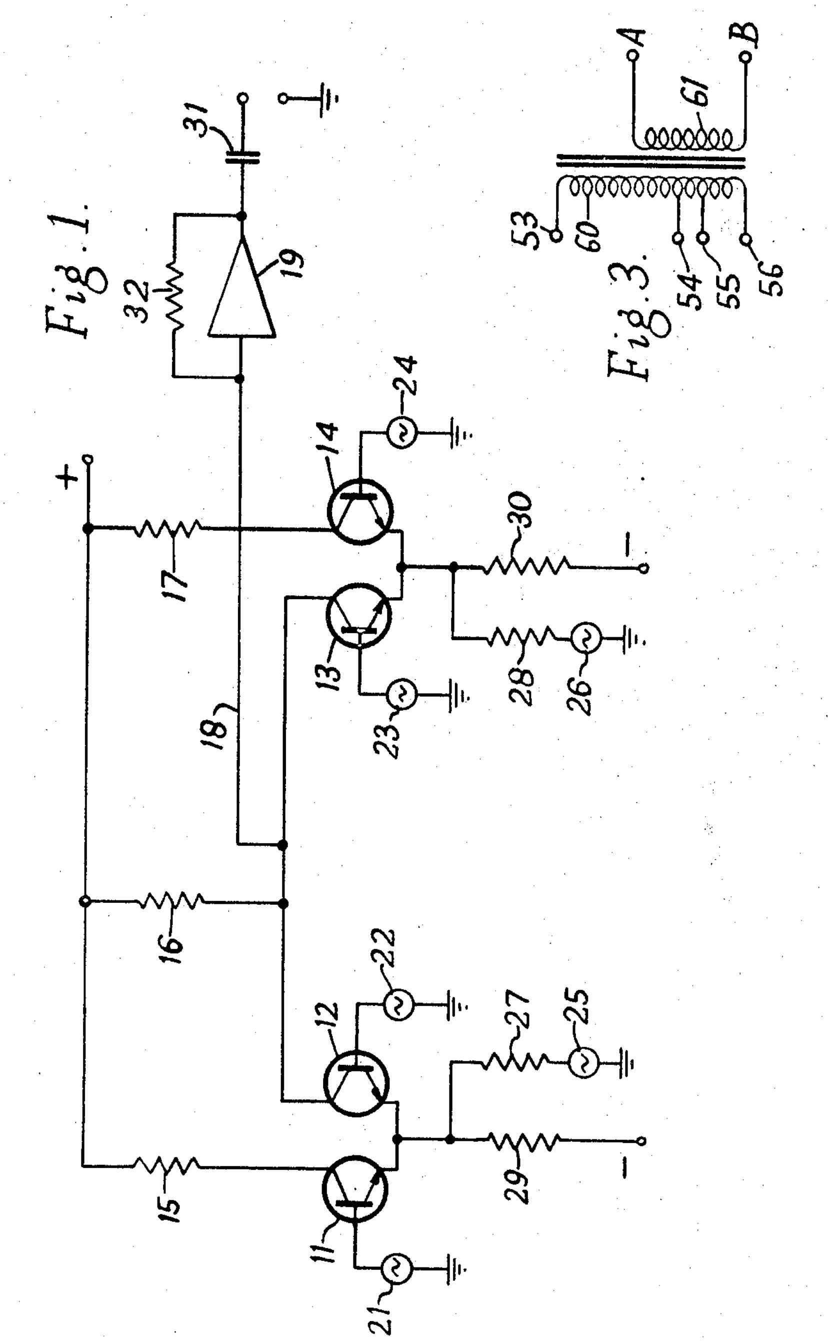
FIG. 1 is a schematic diagram of one circuit incorporating the subject invention.
FIG. 3 is a schematic diagram of a carrier input circuit suitable for use with the embodiment of FIG. 2.

Referring to FIG. 1, it will be seen that a transistor 11 and a transistor 12 are connected in a common emitter pair circuit, or a long-tailed pair circuit, with their emitter electrodes connected together. The common connection of the emitter electrodes is connected to one terminal of a resistor 29, the other terminal of which is connected to a source of negative DC voltage. A series circuit including a resistor 27 and a modulation signal input circuit 25 is connected between the common connection of the emitter electrodes of transistors 11 and 12 and ground. Modulation signal source 25 can be of any of a number of conventional input circuits capable of being connected in series with resistor 27 and inserting a signal therein, and is illustrated schematically as an AC generator.

A carrier signal input circuit 21, shown in FIG. 1 schematically as an AC generator, is connected between the base electrode of transistor 11 and ground. A similar carrier signal input circuit 22 is connected between the base electrode of transistor 12 and ground. A resistor 15 is connected between the collector of transistor 11 and a positive source of DC voltage. A resistor 16 is connected between the collector electrode of transistor 12 and the positive DC source, the collector of transistor 12 also being connected to the collector electrode of a transistor 13 and to a conductor 18 which is connected to the input of an operational amplifier 19.

Transistor 13 is connected in a second common emitter pair circuit with a transistor 14. The emitter electrodes of transistors 13 and 14 are connected via a resistor 30 to a negative DC source, and are also connected to a series circuit including a resistor 28 and a modulation signal input circuit 26, shown as an AC generator. The bases of transistors 13 and 14 are connected to carrier signal input circuits 23 and 24, respectively, similarly shown as AC generators. The collector of transistor 14 is connected via a resistor 17 to the positive DC source.

Operational amplifier 19 is provided with a feedback resistor 32 connected between the input and output terminals of the operational amplifier, the output terminal of the operational amplifier being connected via a blocking capacitor 31 to the system output terminal.

The operation of the circuit of FIG. 1 can be easily understood with reference to certain basic operating characteristics of the transistor circuits involved, which are best expressed in terms of mathematical relationships. The basic relationship satisfied by the most advantageous circuit arrangement of the present invention is that over a selected operating range of a transistor, the relationship between the base voltage, designated by the symbol $V_b$, and the collector current of that transistor, designated by the symbol $I_c$, is $$(1) \qquad V_b = K_1T \log I_c - K_2T + K_3$$

where T is the absolute temperature of the transistor, and the coefficients $K_1$, $K_2$ and $K_3$ are factors dependent on the materials of the transistor. The factor $K_1$ is approximately constant for transistors of the same materials working in the same order of magnitude of current density. Transistors having substantially equal values of the factor $K_2$ and, to a lesser extent, equal values of the factor $K_3$ can be obtained. Slight differences in the value of $K_3$ of two transistors for which $K_1$ and $K_2$ are substantially equal can be compensated for, so that it is possible for two substantially identical transistors to be so employed in a common emitter pair circuit that the relationship $$V_{b1}-V_{b2}=K_1T(\log I_{c1}-\log I_{c2}) \quad (2)$$

holds, where $V_{b1}$ and $I_{c1}$ designate the values of the base voltage and the collector current respectively of one transistor, and $V_{b2}$ and $I_{c2}$ designate the values of the base voltage and the collector current respectively, of the second transistor. Again, $K_1$ is a constant common to both transistors and T is the absolute temperature of both transistors. The invention is based on the realization that from a circuit having two such common emitter pair circuits, it is possible under certain conditions to obtain an output current that is proportional to the product of two input currents and contains only negligible portions of carrier harmonics. Thus, in the present invention, the multiplicative modulator includes four transistors connected in two common emitter pair circuits, the relationship express in Equation 2 holding for the pair of transistors in each common emitter pair circuit and the values of the coefficient $K_1$ being the same for the four transistors.

In addition, in the circuit of this invention, a particular phase relationship exists between the various signals injected into the base and emitter circuits of the four transistors of these two pairs. The signal supplied by modulation input signal circuit 25 in the emitters of the first pair is the same signal provided by circuit 26, except that the signal injected by circuit 26 is inverted in phase, i.e., is 180° different in phase, from the signal inserted by circuit 25. Likewise, the signals inserted by carrier signal input circuits 21, 22, 23, and 24 are the same, with the signals inserted by circuits 21 and 23 being in phase with each other, and the signals inserted by circuits 22 and 24 being in phase with each other but 180° shifted from the signals inserted by circuits 21 and 23.

With this relationship, it will be seen that the instantaneous value X applied to the base electrodes of the transistors of one pair is equal to the difference between the base voltages and that this relationship can be expressed in terms of Equation 2 as $$X=K_1T(\log I_{c1}-\log I_{c2}) \quad (3)$$

The carrier signal is applied to the base electrodes of the transistors 13 and 14 also in phase opposition. However, in applying the carrier oscillation to the common emitter pair circuit comprising transistor 13 and 14, the carrier oscillation is reversed in phase with respect to the carrier oscillation applied to the equivalent transistors of the first common emitter pair circuit.

The modulating signal, or data signal voltage, is so applied to transistors 11 and 12 that the result of the collector current can be expressed as the sum of two currents $a$ and $y$, where $a$ is the magnitude of a current derived from the source of negative voltage connected to the resistor 29 and $y$ is the magnitude of the current set up by the data signal voltage. This is expressed as $$I_{c1}+I_{c2}=a+y \quad (4)$$

Solving Equation 4 for $I_{c1}$ and substituting that value of $I_{c1}$ in Equation 3, it will be seen that the relationship $$\frac{a+y}{I_{c2}}\neq 1+\exp\left(\frac{x}{K_1T}\right) \quad (5)$$

holds.

At the resistor 28, the data signal voltage is applied with a phase reversal so that the sum of the collector currents is equal to the difference between the currents established, so that $$I_{c1}+I_{c2}=a-y \quad (6)$$

is the relationship for the transistors 13 and 14.

Taking the output current from each common emitter pair circuit to be $I_{c2}$, the total output current, $I_o$, in the output conductor 18 is given by the expression $$I_o=\frac{a\neq y}{1+\exp\left(\frac{x}{K_1T}\right)}+\frac{a-y}{1+\exp\left(\frac{x}{K_2T}\right)} \quad (7)$$

which can be expressed as a hyperbolic function as $$I_o=a-y\tanh \tfrac{1}{2}(x/K_1T) \quad (8)$$

Expanding the hyperbolic tangent into the conventional series, it will be seen that $$I_o=a-\frac{1}{2}y\left(\frac{x}{K_1T}\right)+\frac{1}{24}y\left(\frac{x}{K_1T}\right)^3-\ldots \quad (9)$$

Now, if the carrier oscillation is a sinusoidal signal having a frequency W, the expression ($X_0 \cos wt$) can be substituted for X and it will be seen from the term $1/24y(x/K_1T)$ that a third harmonic having a ratio of $1/12(x/K_1T)^2$ to the fundamental is present. However, for silicon transistors at room temperature the value of $K_1T$ is approximately 25 millivolts. Therefore, provided $X_0$ is maintained at approximately 10 millivolts, the third harmonic is negligible, and higher harmonics are virtually absent.

The blocking condenser 31 in series with the output of operational amplifier 19 removes the DC component indicated by the symbol $a$ in Equation 9, so that the effective output current obtained at the output terminal is $$I=-\frac{1}{2K_1T}(xy) \quad (10)$$

This will be recognized as the expression of a current proportional to the product of the two input signals.

A first order correction of the inverse variation of the effective output current with the absolute temperature of the transistors 11, 12, 13 and 14 is effected by the insertion, in series with the carrier input signal circuits, of resistors having negative temperature-resistance coefficients. Alternatively, the resistor 32 in parallel with operational amplifier 19 can be chosen to have a positive temperature resistance coefficient.

Figure 2:
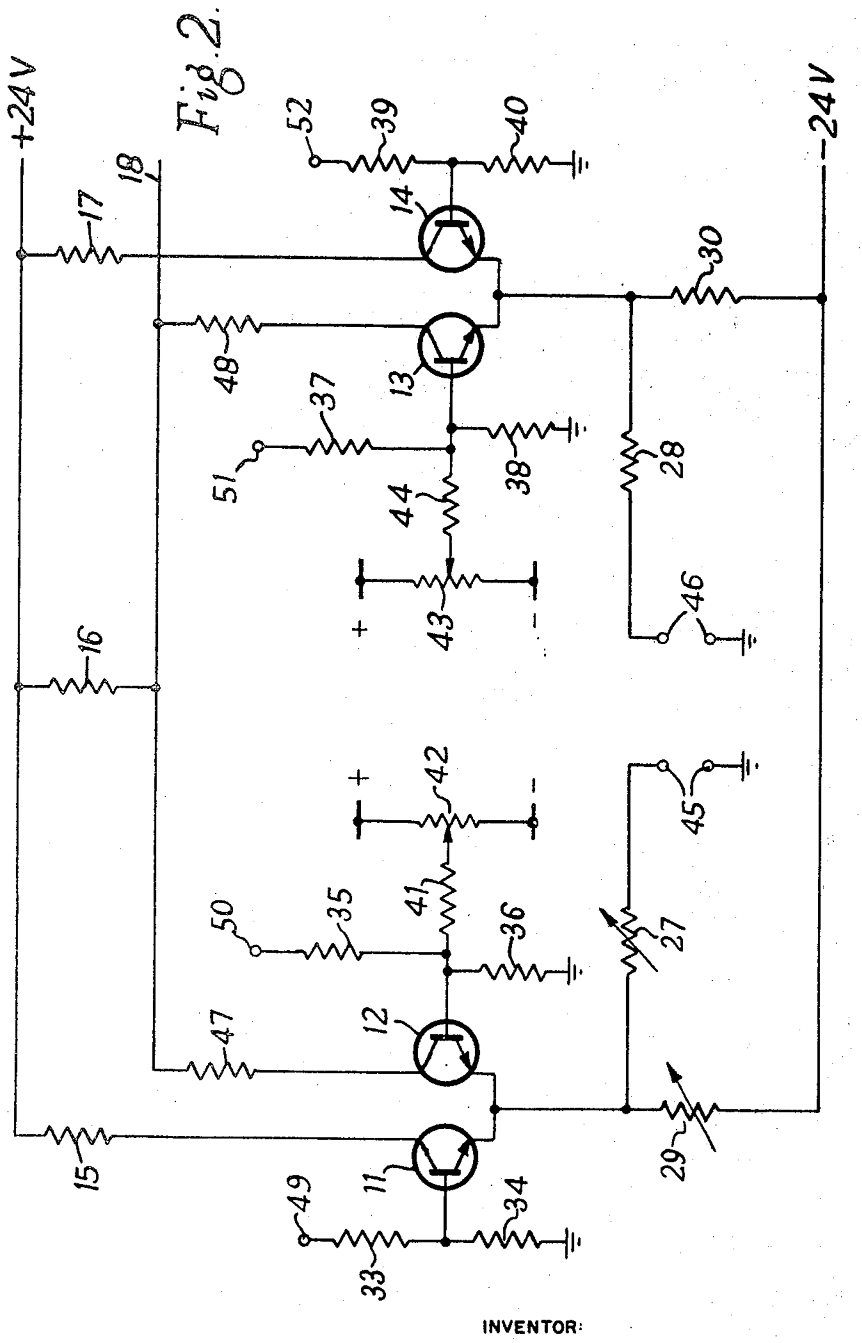
FIG. 2 is a circuit diagram of another embodiment incorporating the subject invention.

A second embodiment is shown in FIG. 2, wherein those elements performing substantially the same functions as the elements in FIG. 1 are given the same reference numerals. Thus, four identical transistors 11, 12, 13 and 14 are connected in two emitter pair circuits. Resistors 15, 47, 48 and 17 are connected to the collector electrodes of the transistors 11, 12, 13 and 14, respectively. A common output conductor 18 from the resistors 47 and 48 is connected to an operational amplifier, not shown. The resistors 15 and 17 and a resistor 16 are connected directly together and to a source of positive DC voltage.

The emitter electrodes of transistors 13 and 14 are connected directly together and to the junction of two resistors 28 and 30. The emitters of transistors 11 and 12 also are connected directly together and to the junction of two variable resistors 27 and 29. Resistors 29 and 30 are connected to a source of negative DC voltage. Values of these resistors which can be used in the circuit of FIG. 2 are as follows:

| Resistor: | Ohms |
|---|---|
| 15 | 10,000 |
| 47 | 10,000 |
| 48 | 10,000 |
| 17 | 10,000 |
| 28 | 240,000 |
| 30 | 240,000 |
| 27 (maximum) | 240,000 |

| Resistor: | Ohms |
|---|---|
| 29 (maximum) | 240,000 |
| 33 | 10,000 |
| 34 | 10,000 |
| 35 | 10,000 |
| 36 | 10,000 |
| 37 | 10,000 |
| 38 | 10,000 |
| 39 | 10,000 |
| 40 | 10,000 |

Negative source −24 v. DC.
Positive source +24 v. DC.

The comparable magnitudes of the resistors 28 and 30 and the small excursions of the voltages applied to the bases and emitters of the transistors 13 and 14 result effectively in constant current feed to the common emitter pair circuit. Similarly, the common emitter pair circuit incorporating transistors 11 and 12 is effectively provided with constant current feed.

A carrier oscillation is applied in phase opposition at terminals 49 and 50 to the bases of transistors 11 and 12, and, with a reversal of algebraic sign, at terminals 51 and 52 to the bases of transistors 13 and 14.

For this purpose, an arrangement such as that shown in FIG. 3 can be used. In FIG. 3, a carrier input circuit is shown as a transformer having a primary winding 60 and a secondary winding 61, the primary winding 60 and a secondary winding 61, the primary winding having end terminals 53 and 56 and intermediate taps 54 and 55, and the secondary winding having terminals A and B. The carrier is applied between terminal 53 and one of terminals 54, 55 and 56. The reversal of algebraic sign is achieved by connecting terminal A of the carrier input circuit to the terminals 49 and 51 of the circuit of FIG. 2 and terminal B of the carrier input circuit to the terminals 50 and 52.

The values of $K_3$ for the transistors 11 and 12 are made equal by adjusting a potentiometer arrangement including resistors 41 and 42 to bring the voltages at the collector electrodes of transistors 11 and 12 to equality. A potentiometer arrangement including resistors 43 and 44 provides this adjustment for the common emitter pair circuit including transistors 13 and 14.

The initial condition adjustments are made by adjusting resistor 27 until a data signal voltage occurring in the absence of a carrier frequency voltage results in there being no output from the multiplicative modulator. The resistor 29 is adjusted until a carrier oscillation occuring in the absence of a data signal voltage results in there being no output from the multiplicative modulator.

While certain advantageous embodiments have been chosen to illustrate the invention, it will be understood by those skilled in the art, that various changes and modifications can be made therein without departing from the scope of the invention as defined in the appended claims .

What is claimed is:

1. Apparatus for producing a voltage the arithmetic representation of which is proportional in magnitude to the product of arithmetic representations of two input signal voltages comprising the combination of a first pair of transistors connected in a common emitter pair circuit, each transistor of said pair having a base electrode, an emittter electrode and a collector electrode, the emitter electrodes of said first pair of transistors being connected together;

a second pair of transistors connected in a common emitter pair circuit, each transistor of said second pair having a base electrode, an emitter electrode and a collector electrode, said emitter electrode of said second pair of transistors being connected together;

means for applying a first input signal to the emitter electrodes of said first pair of transistors;

means for applying said first input signal in inverted form to the emitter electrodes of said second pair of transistors;

means for applying a second signal to the base electrodes of one transistor from each of said pairs;

means for applying said second signal in inverted form to the base electrodes of the remaining transistors of said first and second pairs; and output circuit means coupled to the collector electrodes of two of said transistors each of which constitutes one of the transistors of a different one of said pairs of transistors.

2. Apparatus in accordance with claim 1 wherein each of said first and second pairs of transistors satisfy the relationship $$V_{b1}-V_{b2}=K_1T(\log I_{c1}-\log I_{c2})$$

where $V_{b_1}$ and $V_{b_2}$ are the base voltages of the first and second transistors of each pair, respectively, $K_1$ is a constant common to each transistor of each pair, T is absolute temperature, and $I_{c1}$ and $I_{c2}$ are the collector currents of the first and second transistors of each pair, respectively.

3. Apparatus in accordance with claim 1 wherein said transistors the collector electrodes of which are coupled to said output circuit means are ones to the base electrodes of which said second input signals are applied in inverse relationship.

4. Apparatus in accordance with claim 1 wherein said output circuit means includes an operational amplifier and a capacitor connected in series circuit relationship with said amplifier.

5. Apparatus in accordance with claim 1 wherein each of said means for applying said second input signal includes a resistor having a negative temperature coefficient of resistance.

6. Apparatus in accordance with claim 4 and further comprising a resistor connected in parallel circuit relationship with said operational amplifier, said resistor having a positive temperature coefficient of resistance.

7. An apparatus for producing an electrical signal proportioned in magnitude to the product of two externally generated electrical input signals comprising the combination of a first and a second semiconductor electron valve each having a first electrode, a second electrode and a third electrode, said first and second valves being so interconnected that the difference between the voltages at their first electrodes is proportional to the difference between the logarithms of the currents at their second electrodes;

a third and a fourth semiconductor electron valve each having a first electrode, a second electrode and a third electrode, said third and fourth valves being so interconnected that the difference between the voltages at their first electrodes is proportional to the difference between the logarithms of the currents at their second electrodes;

means for applying an externally generated first signal to the first electrodes of said first and third valves;

means for applying said first signal with a reversal of algebraic sign to the first electrodes of said second and fourth valves;

means for applying an externally generated second signal to the third electrodes of said first and second valves;

means for applying said second signal with a reversal of algebraic sign to the third electrodes of said third and fourth valves; and output circuit means coupled to said second electrodes of said second and third valves.

8. An apparatus in accordance with claim 7 wherein said first and second valves are interconnected to satisfy the relationship $$V_{b1}-V_{b2}=K_1T(\log I_{c1}-\log I_{c2})$$

where $V_{b1}$ and $V_{b2}$ are the voltages of said first electrodes of said first and second valves respectively, $I_{c1}$ and $I_{c2}$ are the currents in said second electrodes of said first and second valves, respectively, $K_1$ is a constant common to each of said valves, and T is absolute temperature; and said third and fourth valves are interconnected to satisfy the same relationship as said first and second valves.

9. Apparatus in accordance with claim 8 wherein said output circuit means comprises an operational amplifier, and a capacitor connected in series circuit relationship with said amplifier.

References Cited

UNITED STATES PATENTS

| | | | |
|---|---|---|---|
| 2,661,152 | 12/1953 | Elias | 235—194 |
| 3,197,626 | 7/1965 | Platzer | 307—229 |

ARTHUR GAUSS, *Primary Examiner.*

H. DIXON, *Assistant Examiner.*

U.S. Cl. X.R.

235—194; 328—145, 160